(12) United States Patent
Lin et al.

(10) Patent No.: US 11,131,341 B1
(45) Date of Patent: Sep. 28, 2021

(54) DUAL MEMBRANE RESTRICTOR

(71) Applicant: National Tsing Hua University, Hsinchu (TW)

(72) Inventors: Shih-Chieh Lin, Hsinchu (TW); Yu-Hsiang Lo, Hsinchu (TW); Yu-Hsin Lin, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 17/001,692

(22) Filed: Aug. 25, 2020

(30) Foreign Application Priority Data

Aug. 7, 2020 (TW) .................................. 109126836

(51) Int. Cl.
*F16C 32/06* (2006.01)
*F16C 29/02* (2006.01)

(52) U.S. Cl.
CPC ...... *F16C 32/0648* (2013.01); *F16C 32/0655* (2013.01); *F16C 29/025* (2013.01)

(58) Field of Classification Search
CPC .. F16C 29/025; F16C 32/064; F16C 32/0644; F16C 32/0648; F16C 32/0655
See application file for complete search history.

(56) References Cited

U.S. PATENT DOCUMENTS

| | | | | |
|---|---|---|---|---|
| 3,403,948 A | * | 10/1968 | Deffrenne | B23Q 1/385 384/118 |
| 3,442,560 A | * | 5/1969 | De Gast | F16C 32/0648 384/12 |
| 3,697,142 A | * | 10/1972 | Fortier | F16C 32/0644 384/99 |
| 3,741,231 A | * | 6/1973 | Roojen | F16C 32/0644 137/101 |

(Continued)

FOREIGN PATENT DOCUMENTS

| | | |
|---|---|---|
| CN | 202391967 | 8/2012 |
| CN | 103909469 A * | 7/2014 |

(Continued)

OTHER PUBLICATIONS

"Office Action of Taiwan Counterpart Application", dated Mar. 9, 2021, p. 1-p. 6.

(Continued)

*Primary Examiner* — Phillip A Johnson
(74) *Attorney, Agent, or Firm* — JCIPRNET

(57) ABSTRACT

A dual membrane restrictor adapted to be connected to an oil supplying device, a loading device, and a recycling device is provided. The dual membrane restrictor includes a casing and first and second membranes. The casing has a first channel connected to the oil supplying device, first and second chambers, a second channel connected to the loading device, and a third channel connected to the recycling device. The first membrane is disposed in the first chamber (Continued)

divided into first upper and lower chambers by the first membrane. The first channel is connected to the first upper chamber. The second membrane is disposed in the second chamber divided into second upper and lower chambers by the second membrane. The second upper chamber is connected to the first lower chamber and the second channel. The second lower chamber is connected to the second channel and the third channel.

10 Claims, 2 Drawing Sheets

(56) References Cited

U.S. PATENT DOCUMENTS

| | | | | |
|---|---|---|---|---|
| 3,785,707 | A | | 1/1974 | Mitsuoka |
| RE28,031 | E | * | 6/1974 | Fortier ................ F16C 32/0644 384/100 |
| 4,368,930 | A | * | 1/1983 | Duchaine ............ F16C 32/0666 384/12 |
| 5,064,297 | A | * | 11/1991 | Tanaka ................ F16C 32/0648 384/100 |
| 10,054,161 | B1 | * | 8/2018 | Lai ........................ F16C 29/025 |
| 10,570,958 | B1 | * | 2/2020 | Lai ...................... F16C 32/0622 |

FOREIGN PATENT DOCUMENTS

| | | | | |
|---|---|---|---|---|
| CN | 109595373 | A | * | 4/2019 |
| DE | 102009018051 | | | 11/2009 |
| DE | 102015122517 | A1 | * | 6/2016 .......... F16C 32/0648 |
| EP | 2251556 | A1 | * | 11/2010 .......... F16C 32/0629 |
| TW | 200935202 | | | 8/2009 |
| TW | 201216027 | | | 4/2012 |
| TW | 201903297 | | | 1/2019 |
| TW | 202020328 | | | 6/2020 |
| WO | WO-2013163851 | A1 | * | 11/2013 .......... F16C 32/0644 |

OTHER PUBLICATIONS

"Search Report of Europe Counterpart Application", dated Jun. 9, 2021, p. 1 -p. 11.

* cited by examiner

DUAL MEMBRANE RESTRICTOR

CROSS-REFERENCE TO RELATED APPLICATION

This application claims the priority benefit of Taiwan application serial no. 109126836, filed on Aug. 7, 2020. The entirety of the above-mentioned patent application is hereby incorporated by reference herein and made a part of this specification.

BACKGROUND

Technical Field

The disclosure relates to a restrictor, and in particular, to a dual membrane restrictor.

Description of Related Art

Hydrostatic bearings, hydrostatic slide blocks, hydrostatic slides, and hydrostatic rotary tables feature advantages such as low friction resistance, low wear, high precision, and long working life and thus are widely applied to processing machines, machine tools, or other mechanical apparatuses. Taking a hydrostatic bearing for example, a lubricant is transported into the bearing from an external oil supplying device, an oil membrane is formed, and that the bearing floats through the oil pressure. When loading of the bearing changes, the oil amount and the oil pressure inside the bearing are required to be correspondingly adjusted, so that a restrictor is disposed between the external oil supplying device and the bearing. Common restrictors include capillary restrictors, orifice restrictors, slide valve restrictors, and membrane restrictors. Taking the existing membrane restrictors for example, a single-membrane design is adopted most of the time. Nevertheless, when the bearing receives low loading, it is difficult for a single membrane restrictor to effectively adjust the oil amount and the oil pressure inside the bearing. As such, an excessive shift is generated by the bearing, and performance of the bearing is thus affected.

SUMMARY

The disclosure provides a dual membrane restrictor capable of effectively adjusting an oil amount and an oil pressure inside a loading device corresponding to a loading change of the loading device, such that performance of the loading device is enhanced.

The disclosure provides a dual membrane restrictor adapted to be connected to an oil supplying device, a loading device, and a recycling device. The dual membrane restrictor includes a casing, a first membrane, and a second membrane. The casing has a first channel, a first chamber, a second chamber, a second channel, and a third channel. The first channel is connected to the oil supplying device. The second channel is connected to the loading device. The third channel is connected to the recycling device. The first membrane is disposed in the first chamber. The first chamber is divided into a first upper chamber and a first lower chamber communicating with each other by the first membrane, and the first channel is connected to the first upper chamber. The second membrane is disposed in the second chamber. The second chamber is divided into a second upper chamber and a second lower chamber communicating with each other by the second membrane, and the second upper chamber is connected to the first lower chamber and the second channel. The second lower chamber is connected to the second channel and the third channel.

In an embodiment of the disclosure, the casing further includes a fourth channel and a fifth channel, and the fourth channel is connected to the first upper chamber and the first lower chamber. The fifth channel is connected to the second channel and the second lower chamber.

In an embodiment of the disclosure, the fourth channel is located between the first upper chamber and the first lower chamber, and the fifth channel is located between the second channel and the second lower chamber.

In an embodiment of the disclosure, the casing further includes a sixth channel, and the sixth channel is connected to the first lower chamber and the second upper chamber.

In an embodiment of the disclosure, the sixth channel is located between the first lower chamber and the second upper chamber.

In an embodiment of the disclosure, the casing includes a first boss and a second boss. The first boss is located in the first lower chamber and protrudes towards the first membrane. The second boss is located in the second lower chamber and protrudes towards the second membrane. The sixth channel penetrates through the first boss, and the third channel penetrates through the second boss.

In an embodiment of the disclosure, a first gap is maintained between the first boss and the first membrane, and a second gap is maintained between the second boss and the second membrane. When pressures of the first lower chamber and the second upper chamber increase, the first gap expands and the second gap reduces. When the pressures of the first lower chamber and the second upper chamber decrease, the first gap reduces and the second gap expands.

In an embodiment of the disclosure, the casing includes a first casing portion, a second casing portion, and a third casing portion, and the second casing portion is disposed between the first casing portion and the third casing portion. the first membrane is sandwiched between the first casing portion and the second casing portion, and the first casing portion has the first upper chamber. The second casing portion has the first lower chamber, the second channel, and the second upper chamber, and the first boss protrudes from the second casing portion. The second membrane is sandwiched between the second casing portion and the third casing portion. The third casing portion has the second lower chamber and the third channel, and the second boss protrudes from the third casing portion.

In an embodiment of the disclosure, the first channel penetrates through the third casing portion, the second casing portion, and the first casing portion.

To sum up, since a dual-membrane design is adopted for the dual membrane restrictor provided by the disclosure, when loading of the loading device changes, the first membrane and the second membrane generates deformation, such that the oil amount inputted to the loading device is adjusted, and the oil pressure in the loading device is also adjusted. In other words, corresponding to the loading change of the loading device, the oil membrane thickness required inside the loading device is maintained by the dual membrane restrictor, the loading device is prevented from generating an excessive shift, and performance of the loading device is thereby enhanced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
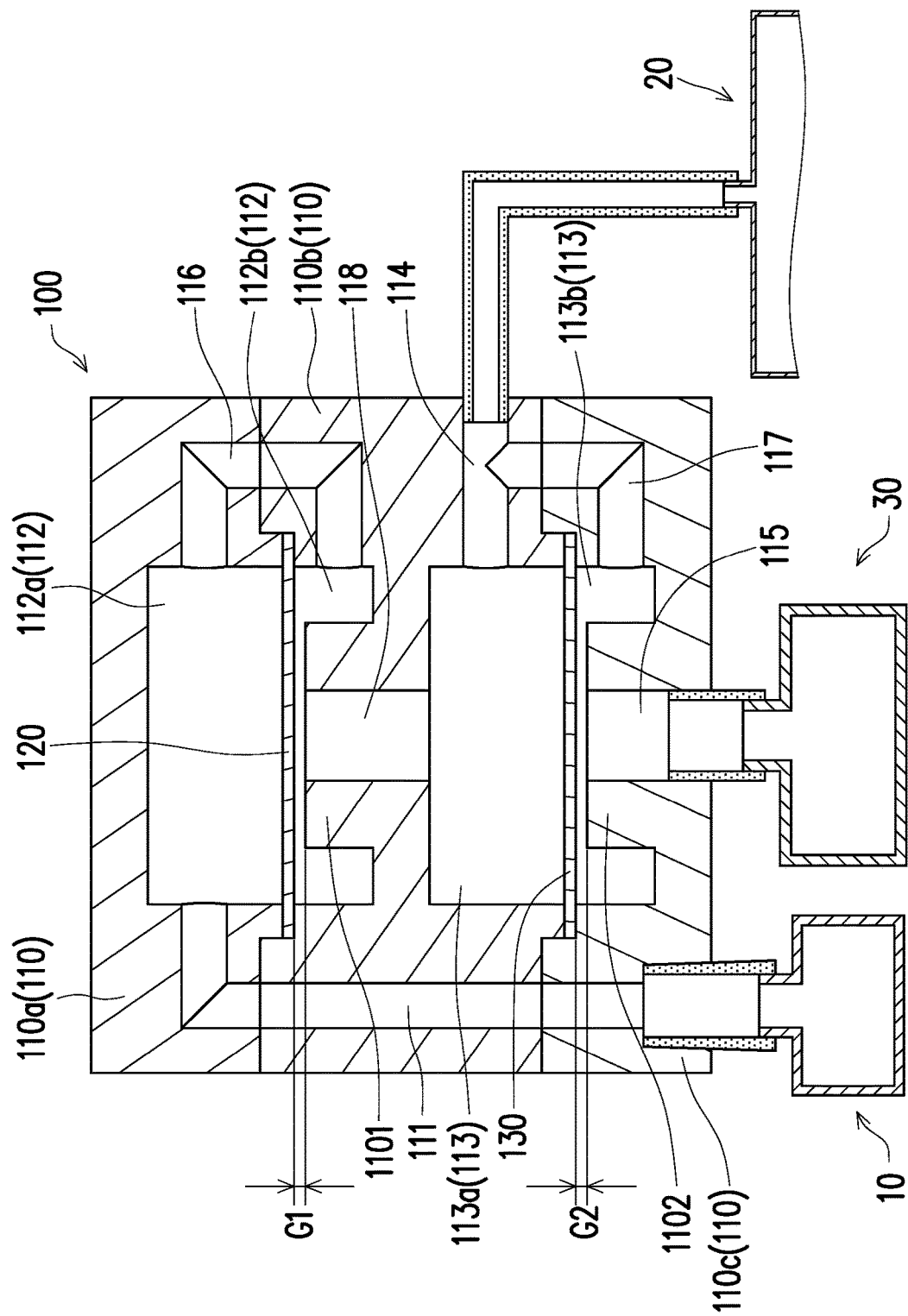
FIG. 1 is a cross-sectional schematic view of a dual membrane restrictor, an oil supplying device, a loading device, and a recycling device according to an embodiment of the disclosure.
Figure 2:
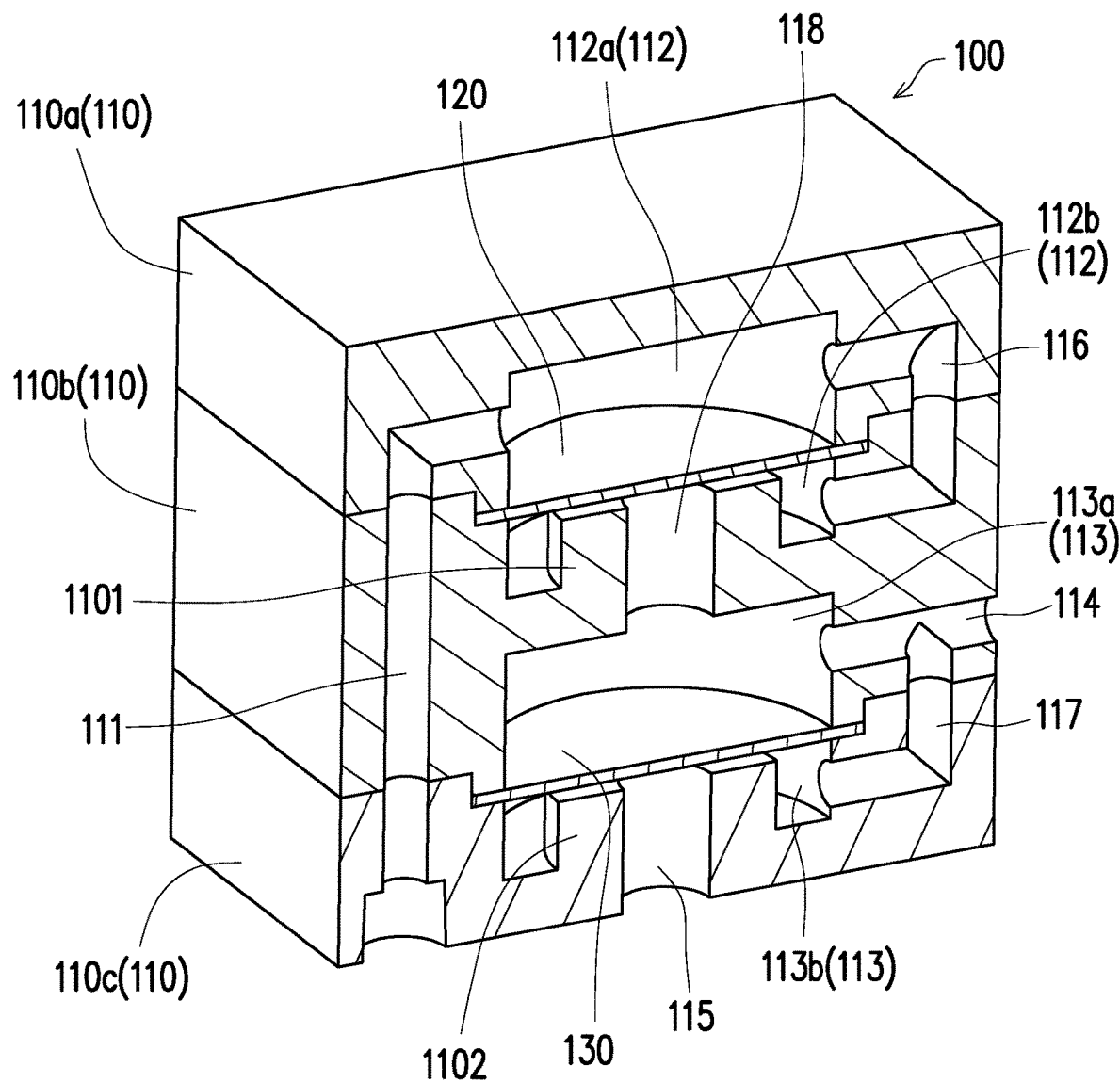
FIG. 2 is a three-dimensional cross-sectional schematic view of the dual membrane restrictor according to an embodiment of the disclosure.

FIG. 1 is a cross-sectional schematic view of a dual membrane restrictor, an oil supplying device, a loading device, and a recycling device according to an embodiment of the disclosure. FIG. 2 is a three-dimensional cross-sectional schematic view of the dual membrane restrictor according to an embodiment of the disclosure. Referring to FIG. 1 and FIG. 2, in this embodiment, a dual membrane restrictor 100 may be applied to a hydrostatic bearing, a hydrostatic slide block, a hydrostatic slide, a hydrostatic rotary table, or other hydrostatic mechanical apparatuses. To be specific, the dual membrane restrictor 100 is adapted to be connected to an oil supplying device 10, a loading device 20, and a recycling device 30. Herein, the oil supplying device 10 may be an oil supplying pump and is configured to supply a lubricant. The dual membrane restrictor 100 is configured to receive the lubricant supplied by the oil supplying device 10 and adjusts an oil amount inputted to the loading device 20 and an oil amount recycled to the recycling device 30 corresponding to a loading change of the loading device 20. For instance, the loading device 20 may be a bearing, a slide, a slide block, a rotary table, or other movement mechanisms, and the recycling device 30 may be an oil tank configured to recycle the lubricant not being inputted to the loading device 20 for reuse.

The dual membrane restrictor 100 includes a casing 110, a first membrane 120, and a second membrane 130. Herein, the first membrane 120 and the second membrane 130 are disposed side by side in the casing 110, are made of an elastic material, and thus may be deformed under pressure. To be specific, the casing 110 is a hollow structure and has a first channel 111, a first chamber 112, a second chamber 113, a second channel 114, and a third channel 115 acting as transmission paths and storage spaces of the lubricant.

The first membrane 120 is disposed in the first chamber 112, and the second membrane 130 is disposed in the second chamber 113. In an embodiment, the first chamber 112 and the second chamber 113 are arranged up and down. In another embodiment, the first chamber 112 and the second chamber 113 are arranged left and right. Note that the relative position between the first chamber 112 and the second chamber 113 is not particularly limited in the disclosure.

Further, the first membrane 120 divides the first chamber 112 into a first upper chamber 112a and a first lower chamber 112b communicating with each other, and the second membrane 130 divides the second chamber 113 into a second upper chamber 113a and a second lower chamber 113b communicating with each other. In an embodiment, the first chamber 112 and the second chamber 113 are arranged up and down, so that the first upper chamber 112a, the first lower chamber 112b, the second upper chamber 113a, and the second lower chamber 113b are arranged in order from top to bottom. In another embodiment, the first chamber 112 and the second chamber 113 are arranged left and right, so that the first upper chamber 112a, the first lower chamber 112b, the second upper chamber 113a, and the second lower chamber 113b are arranged in order from left to right.

With reference to FIG. 1 and FIG. 2, in this embodiment, the first channel 111 is connected to the oil supplying device 10 and the first upper chamber 112a to transport the lubricant from the oil supplying device 10 to the first upper chamber 112a. Subsequently, the lubricant may be transported from the first upper chamber 112a to the first lower chamber 112b and is transported from the first lower chamber 112b to the second upper chamber 113a. The second channel 114 is connected to the second upper chamber 113a and the loading device 20 to transport the lubricant from the second upper chamber 113a to the loading device 20. Further, the second lower chamber 113b is connected to the second channel 114 and the third channel 115. The lubricant not transported to the loading device 20 may be transported from the second channel 114 to the second lower chamber 113b and is transported to the recycling device 30 from the second lower chamber 113b through the third channel 115.

To be specific, the casing 110 further includes a fourth channel 116 and a fifth channel 117. Herein, the fourth channel 116 is located between the first upper chamber 112a and the first lower chamber 112b and is connected to the first upper chamber 112a and the first lower chamber 112b. That is, the first upper chamber 112a is connected to the first lower chamber 112b through the fourth channel 116, so that the lubricant may be transported from the first upper chamber 112a to the first lower chamber 112b. Further, the fifth channel 117 is located between the second channel 114 and the second lower chamber 113b and is connected to the second channel 114 and the second lower chamber 113b. That is, the second upper chamber 113a is connected to the second lower chamber 113b through the second channel 114 and the fifth channel 117, so that the lubricant may be transported from the second upper chamber 113a to the second lower chamber 113b.

In this embodiment, the casing 110 further includes a sixth channel 118. Herein, the sixth channel 118 is located between the first lower chamber 112b and the second upper chamber 113a and is connected to the first lower chamber 112b and the second upper chamber 113a. That is, the first lower chamber 112b is connected to the second upper chamber 113a through the sixth channel 118, so that the lubricant may be transported from the first lower chamber 112b to the second upper chamber 113a.

Moreover, the casing 110 includes a first boss 1101 and a second boss 1102. Herein, the first boss 1101 is located in the first lower chamber 112b and protrudes towards the first membrane 120. The second boss 1102 is located in the second lower chamber 113b and protrudes towards the second membrane 130. The sixth channel 118 penetrates through the first boss 1101 to connect to the first lower chamber 112b and the second upper chamber 113a. The third channel 115 penetrates through the second boss 1102 to connect the second lower chamber 113b and the recycling device 30. Based on arrangement of the first boss 1101, a portion of the first lower chamber 112b forms an annular groove surrounding the first boss 1101 to facilitate transportation and storage of the lubricant. Similarly, based on arrangement of the second boss 1102, a portion of the second lower chamber 113b forms an annular groove surrounding the second boss 1102 to facilitate transportation and storage of the lubricant.

With reference to FIG. 1 and FIG. 2, in this embodiment, pressures of the first lower chamber 112b, the sixth channel 118, and the second upper chamber 113a are identical. When loading received by the loading device 20 rises, the pressures of the first lower chamber 112b, the sixth channel 118, and the second upper chamber 113a rise. In contrast, when loading received by the loading device 20 drops, the pressures of the first lower chamber 112b, the sixth channel 118, and the second upper chamber 113a drop. Based on pressure changes in the first lower chamber 112b, the sixth channel 118, and the second upper chamber 113a, the first membrane 120 and the second membrane 130 generate corresponding deformation, and deformation directions of the first membrane 120 and the second membrane 130 are opposite to each other.

To be specific, a top surface of the first boss 1101 faces a bottom surface of the first membrane 120, and a first gap G1 is maintained therebetween. When the first membrane 120 generates deformation towards the first upper chamber 112a, the first gap G1 expands, such that flow resistance between the first membrane 120 and the first boss 1101 decreases, and a flow amount of the lubricant transported from the first lower chamber 112b to the second upper chamber 113a through the sixth channel 118 increases. In contrast, when the first membrane 120 generates deformation towards the first boss 1101 (or the first lower chamber 112b), the first gap G1 reduces, such that the flow resistance between the first membrane 120 and the first boss 1101 increases, and the flow amount of the lubricant transported from the first lower chamber 112b to the second upper chamber 113a through the sixth channel 118 decreases.

A top surface of the second boss 1102 faces a bottom surface of the second membrane 130, and a second gap G2 is maintained therebetween. When the second membrane 130 generates deformation towards the second upper chamber 113a, the second gap G2 expands, such that flow resistance between the second membrane 130 and the second boss 1102 decreases, and a flow amount of the lubricant transported from the second lower chamber 113b to the recycling device 30 through the third channel 115 increases. In contrast, when the second membrane 130 generates deformation towards the second boss 1102 (or the second upper chamber 113b), the second gap G2 expands, such that the flow resistance between the second membrane 130 and the second boss 1102 increases, and the flow amount of the lubricant transported from the second lower chamber 113b to the recycling device 30 through the third channel 115 decreases.

When loading received by the loading device 20 rises, the pressures of the first lower chamber 112b, the sixth channel 118, and the second upper chamber 113a rise, such that the first membrane 120 generates deformation towards the first upper chamber 112a, and the first gap G1 increases. Correspondingly, the second membrane 130 generates deformation towards the second boss 1102 (or the second lower chamber 113b), and the second gap G2 decreases. Accordingly, the flow amount of the lubricant flowing from the first upper chamber 112a into the first lower chamber 112b and the second upper chamber 113a increases, and the flow amount of the lubricant flowing from the second lower chamber 113b into the recycling device 30 decreases, such that the oil amount inputted to the loading device 20 increases.

When loading received by the loading device 20 drops, the pressures of the first lower chamber 112b, the sixth channel 118, and the second upper chamber 113a drop, such that the first membrane 120 generates deformation towards the first boss 1101 (or the first lower chamber 112b), and the first gap G1 decreases. Correspondingly, the second membrane 130 generates deformation towards the second upper chamber 113a, and the second gap G2 increases. Accordingly, the flow amount of the lubricant flowing from the first upper chamber 112a into the first lower chamber 112b and the second upper chamber 113a decreases, and the flow amount of the lubricant flowing from the second lower chamber 113b into the recycling device 30 increases, such that the oil amount inputted to the loading device 20 decreases.

That is because a dual-membrane design is adopted for the dual membrane restrictor 100, so when loading of the loading device 20 changes, the first membrane 120 and the second membrane 130 generates deformation, and that the oil amount inputted to the loading device 20 is adjusted, and an oil pressure in the loading device 20 is also adjusted. In other words, corresponding to the loading change of the loading device 20, an oil membrane thickness required inside the loading device 20 is maintained by the dual membrane restrictor 100, the loading device 20 is prevented from generating an excessive shift, and performance of the loading device 20 is thereby enhanced.

With reference to FIG. 1 and FIG. 2, in this embodiment, the casing 110 may be formed by a first casing portion 110a, a second casing portion 110b, and a third casing portion 110c. Herein, the second casing portion 110b is disposed and fixed between the first casing portion 110a and the third casing portion 110c. Further, the first membrane 120 is sandwiched between the first casing portion 110a and the second casing portion 110b, and the second membrane 130 is sandwiched between the second casing portion 110b and the third casing portion 110c.

To be specific, the first upper chamber 112a is a groove on the first casing portion 110a, and the fourth channel 116 penetrates through the first casing portion 110a and the second casing portion 110b. The first lower chamber 112b is a groove on the second casing portion 110b. Herein, the first boss 1101 protrudes from the second casing portion 110b, and the sixth channel 118 penetrates through the second casing portion 110b. The second upper chamber 113a is disposed corresponding to the first lower chamber 112b, and the second upper chamber 113a is a groove on the second casing portion 110b.

Furthermore, the second channel 114 penetrates through the second casing portion 110b, and the fifth channel 117 penetrates through the second casing portion 110b and the third casing portion 110c. The second lower chamber 113b is a groove on the third casing portion 110c, and the second boss 1102 protrudes from the third casing portion 110c. Moreover, the fourth channel 116 and the fifth channel 117 are disposed corresponding to the first channel 111, and the first channel 111 penetrates through the third casing portion 110c, the second casing portion 110b, and the first casing portion 110a.

In view of the foregoing, since a dual-membrane design is adopted for the dual membrane restrictor provided by the disclosure, when loading of the loading device changes, the first membrane and the second membrane generates deformation, such that the oil amount inputted to the loading device is adjusted, and the oil pressure in the loading device is also adjusted. In other words, corresponding to the loading change of the loading device, the oil membrane thickness required inside the loading device is maintained by the dual membrane restrictor, the loading device is prevented from generating an excessive shift, and performance of the loading device is thereby enhanced.

Further, when loading received by the loading device increases, the pressures of the first lower chamber and the second upper chamber increase, such that the first membrane generates deformation towards the first upper chamber, and the second membrane generates deformation towards the second boss (or the second lower chamber). In this way, the flow amount of the lubricant flowing into the first lower chamber and the second upper chamber increases, and the flow amount of the lubricant flowing into the recycling device decreases, so that the oil amount inputted to the loading device increases. In contrast, when loading received by the loading device decreases, the pressures of the first lower chamber and the second upper chamber decrease, such that the first membrane generates deformation towards the first boss (or the first lower chamber), and the second membrane generates deformation towards the second upper chamber. In this way, the flow amount of the lubricant flowing into the first lower chamber and the second upper chamber decreases, and the flow amount of the lubricant flowing into the recycling device increases, so that the oil amount inputted to the loading device decreases.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A dual membrane restrictor, adapted to be connected to an oil supplying device, a loading device, and a recycling device, wherein the dual membrane restrictor comprises:
    a casing, comprising a first channel, a first chamber, a second chamber, a second channel, and a third channel, wherein the first channel is connected to the oil supplying device, the second channel is connected to the loading device, and the third channel is connected to the recycling device;
    a first membrane, disposed in the first chamber, wherein the first chamber is divided into a first upper chamber and a first lower chamber communicating with each other by the first membrane, and the first channel is connected to the first upper chamber; and
    a second membrane, disposed in the second chamber, wherein the second chamber is divided into a second upper chamber and a second lower chamber communicating with each other by the second membrane, the second upper chamber is connected to the first lower chamber and the second channel, and the second lower chamber is connected to the second channel and the third channel.

2. The dual membrane restrictor according to claim 1, wherein the casing further comprises a fourth channel and a fifth channel, the fourth channel is connected to the first upper chamber and the first lower chamber, and the fifth channel is connected to the second channel and the second lower chamber.

3. The dual membrane restrictor according to claim 2, wherein the fourth channel is located between the first upper chamber and the first lower chamber, and the fifth channel is located between the second channel and the second lower chamber.

4. The dual membrane restrictor according to claim 2, wherein the casing further comprises a sixth channel, and the sixth channel is connected to the first lower chamber and the second upper chamber.

5. The dual membrane restrictor according to claim 4, wherein the sixth channel is located between the first lower chamber and the second upper chamber.

6. The dual membrane restrictor according to claim 4, wherein the casing comprises a first boss and a second boss, the first boss is located in the first lower chamber and protrudes towards the first membrane, and the second boss is located in the second lower chamber and protrudes towards the second membrane, wherein the sixth channel penetrates through the first boss, and the third channel penetrates through the second boss.

7. The dual membrane restrictor according to claim 1, wherein the casing comprises a first boss and a second boss, the first boss is located in the first lower chamber and protrudes towards the first membrane, and the second boss is located in the second lower chamber and protrudes towards the second membrane.

8. The dual membrane restrictor according to claim 7, wherein a first gap is maintained between the first boss and the first membrane, a second gap is maintained between the second boss and the second membrane,
    the first gap expands and the second gap reduces when pressures of the first lower chamber and the second upper chamber increase, and
    the first gap reduces and the second gap expands when the pressures of the first lower chamber and the second upper chamber decrease.

9. The dual membrane restrictor according to claim 7, wherein the casing comprises a first casing portion, a second casing portion, and a third casing portion, the second casing portion is disposed between the first casing portion and the third casing portion, the first membrane is sandwiched between the first casing portion and the second casing portion, and the first casing portion has the first upper chamber, wherein the second casing portion has the first lower chamber, the second channel, and the second upper chamber, the first boss protrudes from the second casing portion, and the second membrane is sandwiched between the second casing portion and the third casing portion, wherein the third casing portion has the second lower chamber and the third channel, and the second boss protrudes from the third casing portion.

10. The dual membrane restrictor according to claim 9, wherein the first channel penetrates through the third casing portion, the second casing portion, and the first casing portion.

* * * * *